United States Patent
Kaneko (10) Patent No.: US 10,608,444 B2
(45) Date of Patent: Mar. 31, 2020

(54) POWER SUPPLY SYSTEM

(71) Applicant: Envision AESC Japan Ltd., Kanagawa (JP)

(72) Inventor: Kazumi Kaneko, Kanagawa (JP)

(73) Assignee: Envision AESC Japan Ltd., Kanagawa (JP)

( * ) Notice: Subject to any disclaimer, the term of this patent is extended or adjusted under 35 U.S.C. 154(b) by 0 days.

(21) Appl. No.: 16/095,082

(22) PCT Filed: Sep. 19, 2017

(86) PCT No.: PCT/JP2017/033732
§ 371 (c)(1),
(2) Date: Oct. 19, 2018

(87) PCT Pub. No.: WO2018/056263
PCT Pub. Date: Mar. 29, 2018

(65) Prior Publication Data
US 2019/0123567 A1  Apr. 25, 2019

(30) Foreign Application Priority Data

Sep. 21, 2016 (JP) ................................ 2016-184587
Apr. 27, 2017 (JP) ................................ 2017-088109

(51) Int. Cl.
*H02J 7/00* (2006.01)
*B60L 58/13* (2019.01)
(Continued)

(52) U.S. Cl.
CPC ............ *H02J 7/0021* (2013.01); *B60L 58/13* (2019.02); *B60L 58/21* (2019.02); *H01M 10/48* (2013.01); *H02J 7/00* (2013.01); *Y02T 10/7005* (2013.01)

(58) Field of Classification Search
CPC . H02J 7/0021; H02J 7/00; B60L 58/21; B60L 58/13; H01M 10/48; Y02T 10/7005
(Continued)

(56) References Cited

U.S. PATENT DOCUMENTS 7,579,842 B2 *  8/2009  Hunter .................. H02J 7/0019
                                                               320/103
8,704,405 B2   4/2014  Deng et al.
(Continued)

FOREIGN PATENT DOCUMENTS

JP    2011-072153 A        4/2011
JP    WO2012/164630 A1    12/2012
(Continued)

*Primary Examiner* — Suresh Memula
(74) *Attorney, Agent, or Firm* — Morgan, Lewis & Bockius LLP (57) ABSTRACT

The present invention reduces the possibility that parallel connection is not allowed at the time of reactivation. A plurality of battery packs (11, 12) connected in parallel each include a chargeable-dischargeable battery string (21, 22), relays (41, 42) provided in series to the battery string (21, 22), and a detection unit that detects the state of the battery string. A master control unit (34) that controls the battery packs turns off the relays of the battery packs when a circulating current falls below a cancel-allowing current and, on the basis of a result obtained by the detection unit, makes the cancel-allowing current smaller as the SOC-equivalent value of the battery pack into which the largest amount of the circulating current flows increases.

6 Claims, 6 Drawing Sheets

(51) Int. Cl.
*B60L 58/21* (2019.01)
*H01M 10/48* (2006.01)
(58) Field of Classification Search
USPC .......................................................... 320/116
See application file for complete search history.

(56) References Cited

U.S. PATENT DOCUMENTS

| | | | |
|---|---|---|---|
| 8,902,072 B2* | 12/2014 | Lee ........................ | G01R 31/28 340/636.1 |
| 9,018,956 B2* | 4/2015 | Eguchi .................. | H02J 7/0016 324/434 |
| 2006/0001403 A1* | 1/2006 | Yudahira .......... | G01R 19/16542 320/134 |
| 2008/0156551 A1* | 7/2008 | Kawahara ............... | B60L 58/22 701/22 |
| 2010/0052615 A1* | 3/2010 | Loncarevic ........... | H02J 7/0016 320/118 |
| 2011/0074354 A1 | 3/2011 | Yano | |
| 2011/0115416 A1* | 5/2011 | Oh ......................... | H02J 7/345 318/139 |
| 2013/0141047 A1* | 6/2013 | Huang .................. | H02J 7/0018 320/116 |
| 2014/0103859 A1 | 4/2014 | Nishi | |

FOREIGN PATENT DOCUMENTS

| | | |
|---|---|---|
| JP | 2013-099167 A | 5/2013 |
| JP | 2013-524748 A | 6/2013 |
| JP | 2016-208588 A | 12/2016 |

\* cited by examiner

POWER SUPPLY SYSTEM

TECHNICAL FIELD

The present invention relates to a power supply system.

BACKGROUND ART

A battery pack including a chargeable-dischargeable battery string and a battery management system (BMS) that monitors and controls charging and discharging of the battery string is mounted in, for example, hybrid cars, electric vehicles, and so on. Such a battery pack mounted in a vehicle is charged with power generated by a power generator (regeneration device) of the vehicle.

To increase the capacity of the whole power supply system including a battery pack, it is the case that a plurality of battery packs are provided within the power supply system and a relay provided in series to the assembled battery of each battery pack is turned on to thereby connect the plurality of battery packs in parallel. In this case, if the total voltage of the battery string differs between the battery packs by a potential difference $\Delta V$, a circulating current is generated between the battery packs in accordance with the potential difference $\Delta V$. When the magnitude of the circulating current exceeds the maximum current that the battery packs can withstand, a relay failure may occur. PTL 1 discloses a technique for allowing the battery packs to be connected with each other only in a case where the potential difference $\Delta V$ is equal to or smaller than a predetermined value.

To shut down the power supply system having a plurality of battery packs connected in parallel, a device of interest needs to be stopped first, and a relay provided in each battery pack needs to be turned off last. At the time point when the current between the device and the power supply system becomes zero or substantially no current flows between the device and the power supply system due to, for example, the stop of the device, if the total voltage of the battery string differs between the battery packs, the circulating current circulating between the battery packs flows in accordance with the difference.

When the relay within each battery pack is opened in a state where a large circulating current is flowing, the difference in the total voltage between the battery packs is maintained, which may be a cause of the circulating current described above generated when the power supply system is started up next time. PTL 2 discloses a technique in which, to equalize the voltage between the battery packs at the time when the device is shut down, the relay within each battery pack is left turned on for a while after the power supply system is electrically disconnected from the device to make the circulating current flow, and the relay within each battery pack is turned off after an elapse of a predetermined period.

CITATION LIST

Patent Literature

PTL 1: Japanese Unexamined Patent Application Publication (Translation of PCT Application) No. 2013-524748
PTL 2: Japanese Unexamined Patent Application Publication No. 2011-72153

SUMMARY OF INVENTION

Technical Problem

Even in the case where the voltage is equalized between the plurality of battery packs by making the circulating current continuously flow for a predetermined period, as described by PTL 2, the circulating current does not necessarily become zero completely. When the relay is turned off in this state, the potential difference between the packs remains, and a condition for allowing parallel connection might not be satisfied at the time of the next activation. If the predetermined period is made longer, it is not possible to shut down the system during the period, which is an issue.

An object of the present invention is to provide a power supply system with which the shut-down time of the system can be optimized and the possibility that parallel connection is not allowed at the time of the next activation can be reduced.

Solution to Problem

A power supply system according to an aspect of the present invention is a power supply system including: a plurality of battery packs connected in parallel; and control means for controlling the plurality of battery packs, the plurality of battery packs each including a chargeable-dischargeable battery string, a relay provided in series to the battery string, and detection means for detecting a state of the battery string. The control means performs control to turn off the relay of each of the plurality of battery packs when a circulating current that flows between the plurality of battery packs falls below a cancel-allowing current and, on the basis of a result of detection by the detection means, makes the cancel-allowing current smaller as an SOC (state of charge)-equivalent value of a batter pack, among the plurality of battery packs, into which a largest amount of the circulating current flows increases.

It is preferable that the SOC-equivalent value be an SOC (state of charge) value of the battery pack into which the largest amount of the circulating current flows or a voltage value of the battery pack into which the largest amount of the circulating current flows. It is preferable that the battery string be formed by connecting a plurality of unit batteries in series, and the unit batteries be each constituted by one battery cell or a plurality of battery cells connected in parallel. It is preferable that the SOC (state of charge) value of the battery pack into which the largest amount of the circulating current flows be an SOC value of one of the unit batteries within the battery pack into which the largest amount of the circulating current flows, the SOC value of the one of the unit batteries being a maximum SOC value.

It is preferable that the voltage value of the battery pack into which the largest amount of the circulating current flows be a voltage value of one of the unit batteries within the battery pack into which the largest amount of the circulating current flows, the voltage value of the one of the unit batteries being a maximum voltage value. It is preferable that each battery pack among the plurality of battery packs include a battery management system that monitors and controls the battery pack, and the battery management system provided in one of the plurality of battery packs be a master battery management system that includes the control means.

Advantageous Effects of Invention

The shut-down time of the system can be optimized, and the possibility that parallel connection is not allowed at the time of the next activation can be reduced.

DESCRIPTION OF EMBODIMENTS

Figure 1:
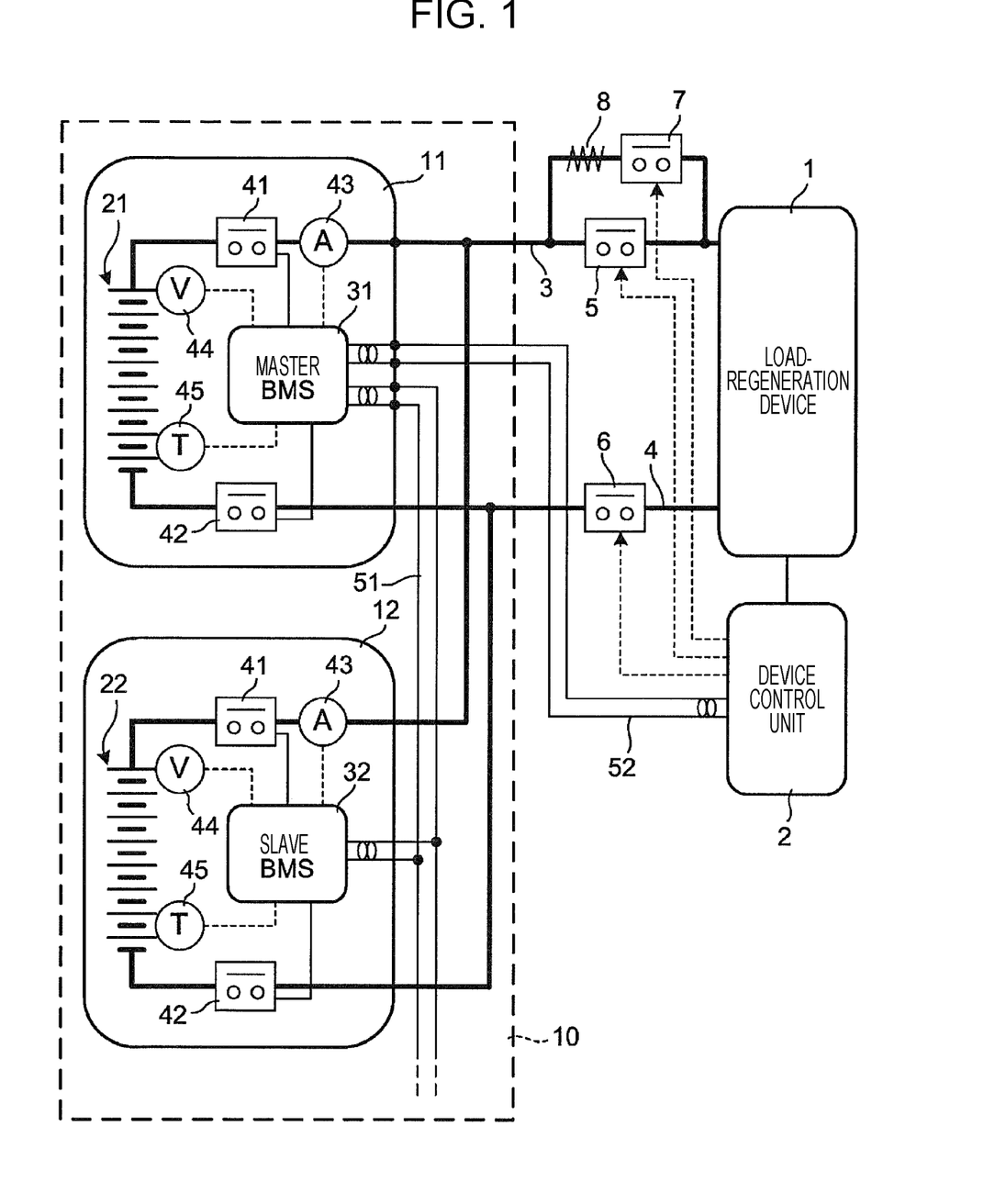
FIG. 1 is a block diagram illustrating a configuration of a power supply system according to an embodiment of the present invention.

FIG. 1 is a block diagram illustrating a power supply system according to an embodiment of the present invention. A power supply system 10 illustrated in FIG. 1 is connected with, for example, a load-regeneration device 1 that is a load and has a power generation function (or power regeneration function), supplies power to the load-regeneration device 1, and is charged with power from the load-regeneration device 1. The load-regeneration device 1 and the power supply system 10 are connected with each other via a pair of power lines 3 and 4. In the figure, a path along which power is supplied to the load-regeneration device 1 and a path along which a charging current flows into the power supply system are represented by a thick line.

To make the load-regeneration device 1 and the power supply system 10 be electrically disconnectable from each other, relays 5 and 6 are inserted to the power lines 3 and 4, respectively. To reduce an inrush current that is generated when the power supply system 10 is connected with the load-regeneration device 1, a combination of a pre-charge relay 7 and a pre-charge resistor 8 connected in series is provided parallel to the relay 5. A device control unit 2 that controls the whole device (for example, a vehicle) in which the power supply system 10 is mounted and that specifically controls the load-regeneration device 1 is connected with the power supply system 10 via a signal line 52. The device control unit 2 also controls opening and closing of the relays 5 and 6 and the pre-charge relay 7.

In the power supply system 10, a plurality of battery packs that are connected in parallel with each other and that are connected with the power lines 3 and 4 are provided. Here, the battery packs are battery packs that each include a battery string and a BMS, and need not include a case, a cooling device, and so on. In the figure, two battery packs 11 and 12 are provided; however, the number of battery packs may be three or more. The battery pack 11 includes a battery string 21 and a master BMS (battery management system) 31, and the battery pack 12 includes a battery string 22 and a slave BMS 32.

The battery strings 21 and 22 each have a configuration in which a plurality of electric cells are connected in series. As the electric cells, secondary cells of any type can be used. The following description is given under the assumption that each electric cell is a lithium-ion secondary cell. The battery packs 11 and 12 are connected in parallel, and therefore, the number of electric cells connected in series in the battery string 21 included in the battery pack 11 and the number of electric cells connected in series in the battery string 22 included in the battery pack 12 are the same. It is preferable that the nominal capacitance of the battery pack 11 and that of the battery pack 12 be the same.

The BMSs (battery management systems) 31 and 32 have a function of monitoring the battery strings 21 and 22 in the battery packs 11 and 12 that include the BMSs 31 and 32 and controlling the battery packs 11 and 12, respectively. Specifically, the master BMS 31 also controls the battery packs 11 and 12 included in the power supply system 10 as a whole. In a case where three or more battery packs are provided in the power supply system 10, the third and subsequent battery packs each have a battery string and a slave BMS as in the battery pack 12. The slave BMS 32 is connected with the master BMS 31 via a signal line 51. The signal line 52 extending from the device control unit 2 is also connected with the master BMS 31.

In the battery pack 11, a relay 41 that connects the power line 3 with the positive-side terminal of the battery string 21 so as to be disconnectable, a relay 42 that connects the power line 4 with the negative-side terminal of the battery string 21 so as to be disconnectable, a current sensor (A) 43 that measures the current flowing through the battery string 21, a voltage sensor (V) 44 that measures the terminal voltage of each electric cell in the battery string 21, and a temperature sensor (T) 45 that measures the temperature of each electric cell or each electric cell group in the battery string 21 are further provided in addition to the battery string 21 and the master BMS 31.

Measurement values obtained by the sensors 43 to 45 are sent to the master BMS 31, and the master BMS 31 controls opening and closing of the relays 41 and 42 of the battery pack 11 on the basis of the sent measurement values. In the battery pack 12, the relays 41 and 42, the current sensor 43, the voltage sensor 44, and the temperature sensor 45 are similarly provided. In the battery pack 12, measurement values obtained by the sensors 43 to 45 are sent to the slave BMS 32, and the relays 41 and 42 of the battery pack 12 are controlled in accordance with output from the slave BMS 32 in response to an instruction from the master BMS 31.

Now, an overall operation of the power supply system 10 is described with reference to FIG. 2. Here, a description is given under the assumption that the power supply system 10 is mounted in a vehicle. When the ignition switch of the vehicle is turned on, the BMSs 31 and 32 each perform an activation process for starting up the power supply system 10 on the basis of an order from the device control unit 2 in step 91. In each of the master BMS 31 and the slave BMS 32, a slave control unit 33 measures the total voltage of the battery pack and transmits the result of measurement to a master control unit 34. The master control unit 34 measures the potential difference between the battery packs. If the master control unit 34 determines that the potential difference is smaller than a predetermined value, the master control unit 34 transmits an instruction for turning on the relays 41 and 42 to each slave control unit 33. The BMSs 31 and 32 each turn on the relays 41 and 42 (so as to be continuous) and transmit a state signal indicating the state to the device control unit 2. The device control unit 2 turns on the pre-charge relay 7 and the relays 5 and 6 (so as to be continuous).

Thereafter, the BMSs 31 and 32 respectively measure the charging and discharging currents flowing through the battery strings 21 and 22 of the battery packs 11 and 12 and the voltage and temperature of each electric cell that constitutes the battery strings 21 and 22 in step 92. In step 93, the BMSs 31 and 32 respectively calculate the SOC (state of charge), SOP (state of power), and OCV (open circuit voltage) of the battery strings 21 and 22 on the basis of the results of measurement. In step 94, the BMSs 31 and 32 transmit the calculated values to a higher-level system (for example, the device control unit). To repeat the process from step 92 to step 94 during a period in which the ignition switch of the vehicle remains turned on, in step 95, it is determined whether the ignition switch remains turned on.

If it is determined that the ignition switch remains turned on, the flow returns to step 92. If the ignition switch is turned off, the BMSs 31 and 32 each perform a stop process in step 96. When the stop process ends, the power supply system 10 enters a complete stop state, and the series of processes ends. The process from step 91 to step 96 is repeatedly performed in response to an operation of turning on and off the ignition switch.

For example, in a case where battery packs are each constituted by a battery string formed of a plurality of lithium-ion secondary cells, the plurality of battery packs are allowed to be connected in parallel on the condition that, for example, lithium deposition does not occur at an electric cell in the battery pack that is charged with the circulating current generated at the time of reactivation. It is known that lithium deposition occurs with a smaller current as the SOC (state of charge) value of the battery pack into which a current flows (that is, the battery pack that is charged) increases. As the SOC value increases, the connection condition is made stricter.

In this embodiment, as the SOC value of the battery pack into which the largest amount of circulating current flows (the battery pack that is charged with the circulating current to the largest degree) increases, the condition for turning off the relays is made stricter, that is, the circulating current is sufficiently narrowed and the potential difference ΔV between the battery packs is made smaller, to thereby reduce the possibility that, when the battery packs are connected in parallel with each other at the time of the next start-up, the parallel connection is not allowed due to the voltage difference.

Specifically, in the power supply system 10 according to this embodiment, to allow the battery packs 11 and 12 to be connected in parallel with each other in the activation process in step 91 that is performed when the ignition switch is turned on next time, in the stop process in step 96, as the SOC value of the battery pack into which the largest amount of circulating current Ic flowing between the plurality of battery packs 11 and 12 flows increases, the value of a cancel-allowing current Is is made smaller, and when the circulating current Ic falls below the cancel-allowing current Is, the relays 41 and 42 of each of the battery packs 11 and 12 are controlled to be turned off. The master BMS 31 performs control for turning off the relays 41 and 42. For the relays 41 and 42 within the battery pack 12, the slave BMS 32 performs an operation for turning off the relays 41 and 42 in response to an instruction from the master BMS 31.

Now, lithium deposition at the negative electrode, which is a condition for determining the cancel-allowing current Is in this embodiment in the case where the electric cells are lithium-ion secondary cells, is described. When a current I flows through an electric cell in the charging direction, lithium may be deposited at the negative electrode depending on the condition. It is possible to determine whether lithium deposition occurs on the basis of a relationship between the charging current I and the SOC of the cell. In general, as the charging current I increases, lithium deposition occurs even with a small SOC. The upper limit of a range within which lithium deposition does not occur is represented by a downward sloping curved or straight line as illustrated by the thick line in FIG. 3, in which the horizontal axis represents the charging current I and the vertical axis represents the SOC, under the assumption that the temperature is constant. This curved or straight line is called a deposition limiting line.

Figure 3:
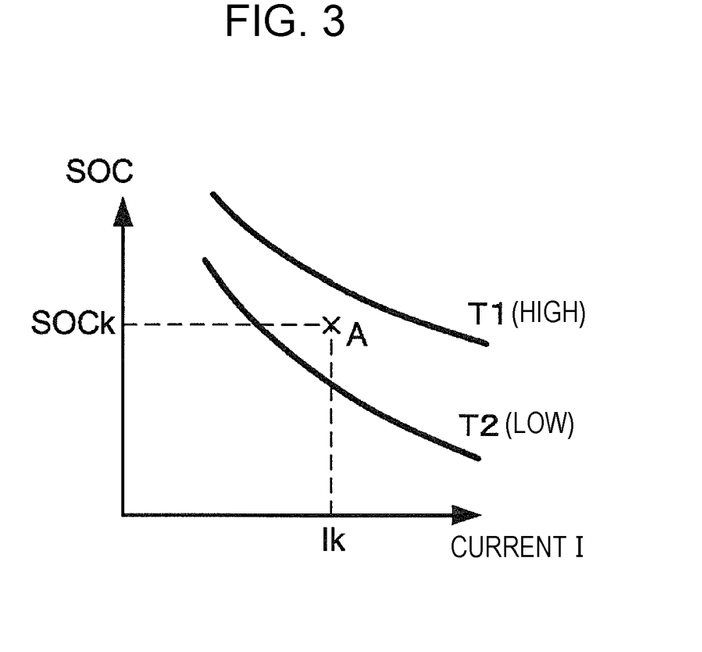
FIG. 3 is a graph illustrating conditions for preventing lithium deposition.

As the temperature T increases, lithium deposition occurs to a smaller degree. Therefore, as the temperature increases, the deposition limiting line is located on an upper side in a graph in which the horizontal axis represents the charging current I and the vertical axis represents the terminal voltage V. Here, the idea is based on the SOC of an electric cell. As the SOC increases, the terminal voltage (more precisely, the open circuit voltage (OCV)) of the cell monotonously increases. Therefore, an idea based on the terminal voltage of the cell instead of the SOC produces the same result. The deposition limiting line moving toward a lower SOC at a lower temperature indicates the possibility that lithium deposition occurs due to a temperature change even for the same current I and for the same SOC.

Figure 4:
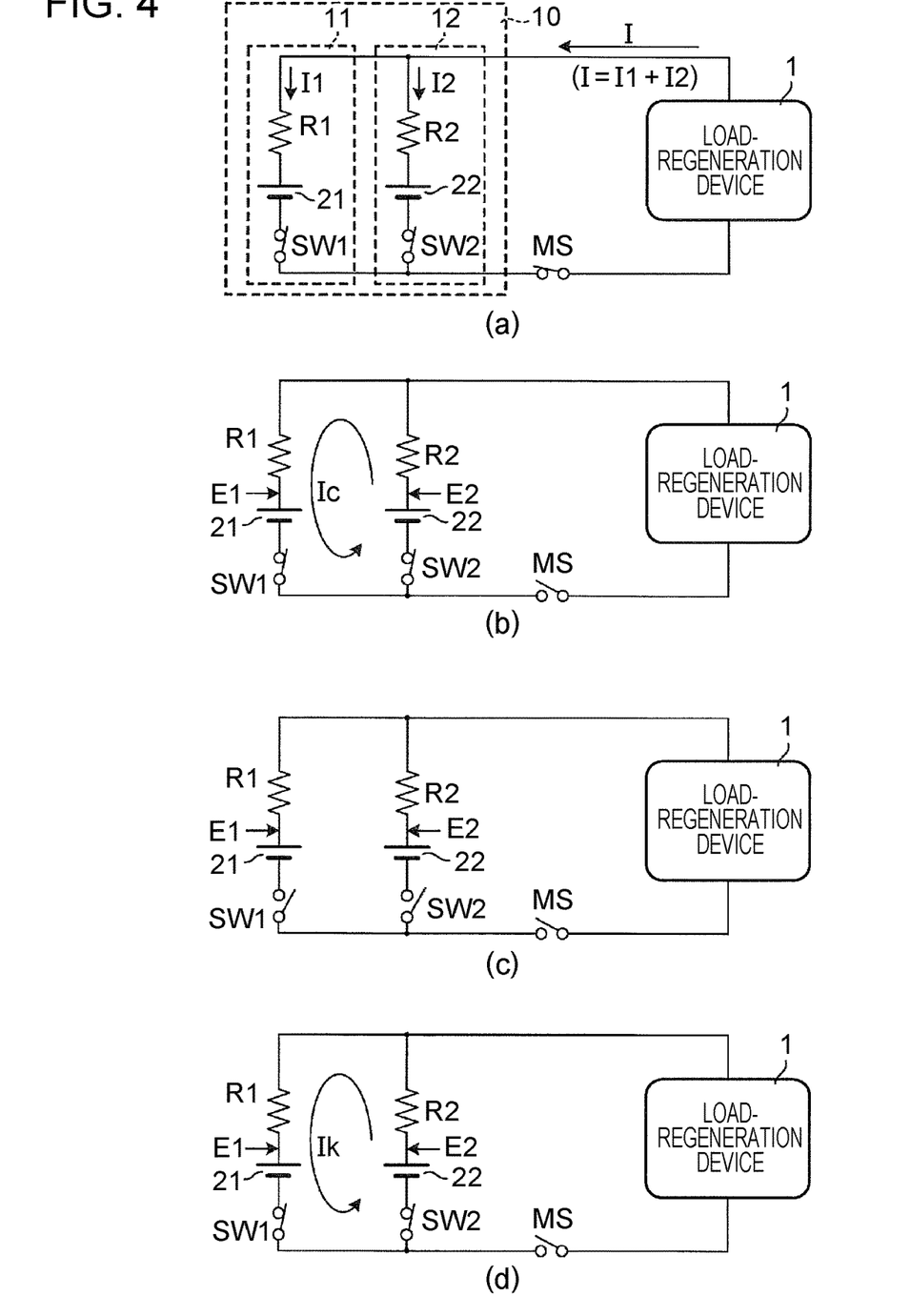
FIG. 4 includes diagrams for describing a circulating current.

FIG. 4 includes diagrams for describing the circulating current when the battery packs 11 and 12 are connected in parallel, and illustrates the circuit illustrated in FIG. 1 in a simplified manner as equivalent circuit diagrams. In FIG. 4, the relays 5 and 6 and the pre-charge relay 7 are collectively represented by a main switch MS, the relays 41 and 42 within the battery pack 11 are collectively represented by a switch SW1, and the relays 41 and 42 within the battery pack 12 are collectively represented by a switch SW2. An internal resistor of the battery string 11 and that of the battery string 12 are respectively represented by resistors R1 and R2.

Accordingly, the battery pack 11 is represented as a circuit in which the resistor R1, the battery string 21, and the switch SW1 are connected in series, and the battery pack 12 is represented as a circuit in which the resistor R2, the battery string 22, and the switch SW2 are connected in series. The configuration constituted by the power supply system 10 and the load-regeneration device 1 is represented as a configuration in which the battery pack 11 and the battery pack 12 are connected parallel to the load-regeneration device 1 via the main switch MS. In FIGS. 4(b) to 4(d), the frame lines that outline the power supply system 10 and the battery packs 11 and 12 are not illustrated to avoid complicated drawings.

FIG. 4(a) illustrates a state where the main switch MS and the switches SW1 and SW2 are closed (turned on), and the power supply system 10 is externally charged, that is, charged by the load-regeneration device 1, with the charging current I. At this time, the charging current that flows through the battery pack 11 is represented by I1, the charging current that flows through the battery pack 12 is represented by I2, and I=I1+I2 is satisfied. If there is an imbalance between the internal resistors R1 and R2, there is also an imbalance between the charging currents I1 and I2. Accordingly, the battery packs 11 and 12 differ in SOC, and the battery packs 11 and 12 are also differ in OCV.

Here, when the main switch MS is opened (turned off) as illustrated in FIG. 4(b), charging by the load-regeneration device 1 stops. If it is assumed that the terminal voltage of the battery string 21 and that of the battery string 22 at this time point are represented by E1 and E2 and that E1≠E2 is satisfied due to an imbalance between the internal resistors R1 and R2, the circulating current Ic expressed by Ic=(E2−E1)/(R1+R2) flows between the battery packs 11 and 12. The circulating current Ic gradually decreases as the time passes.

Figure 2:
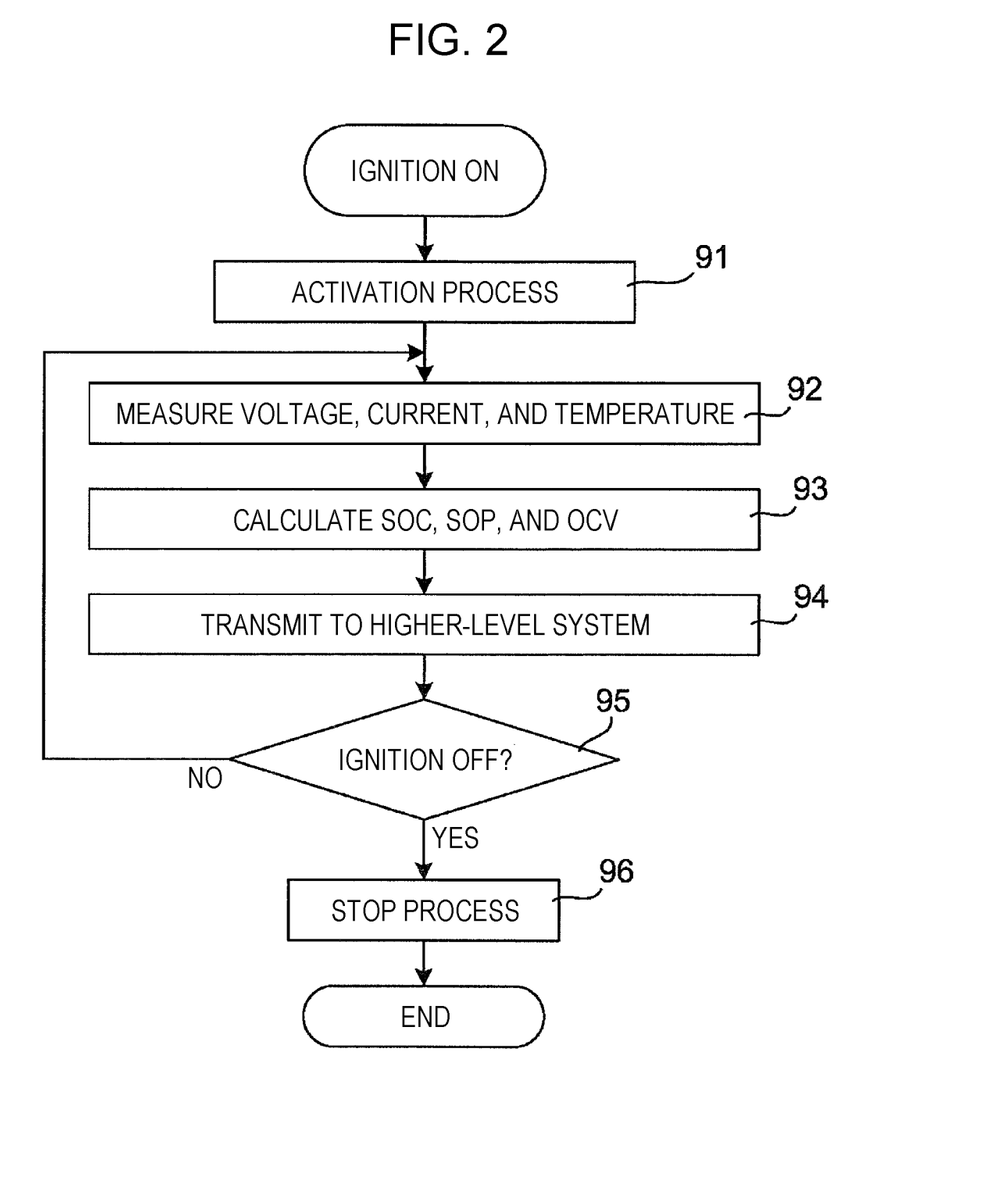
FIG. 2 is a flowchart for describing an overall operation of the power supply system.

Thereafter, at the time point when the value of the circulating current Ic falls below a predetermined value, the switches SW1 and SW2 are turned off, as illustrated in FIG. 4(c), to complete the stop process illustrated in step 96 (FIG. 2). The value of the circulating current immediately before turning off the switches SW1 and SW2 is represented by Ik. When the switches SW1 and SW2 are turned off, parallel connection of the battery packs 11 and 12 are canceled, and the circulating current stops. However, the potential difference between the battery packs 11 and 12 is kept as is, and the SOC is also kept as is.

Subsequently, when the ignition switch is turned on, and the activation process illustrated in step 91 (FIG. 2) starts, the switches SW1 and SW2 are turned on, and the battery packs 11 and 12 are connected in parallel, as illustrated in FIG. 4(d). The voltage and SOC of each of the battery packs 11 and 12 substantially remain unchanged from the time point when the previous stop process is completed. Therefore, the circulating current that flows when the switches SW1 and SW2 are turned on is substantially equal to the current Ik that flows at the time of the immediately previous turning off of the switches SW1 and SW2.

Here, a case is assumed where the ambient temperature decreases from T1 to T2 during a period from when the switches SW1 and SW2 are turned off until when the switches SW1 and SW2 are turned on again. When it is assumed that the SOC and the circulating current immediately before the switches SW1 and SW2 are turned off are respectively represented by SOCk and Ik, even if a point A defined by SOCk and Ik in the graph illustrated in FIG. 3 is below the deposition limiting line for the temperature T1, the point A can be located above the deposition limiting line for the temperature T2.

The domain above the deposition limiting line is a domain in which lithium deposition at the negative electrode can occur. Accordingly, a decrease in the ambient temperature of the power supply system 10 raises the possibility that lithium deposition occurs upon reactivation. The power supply system 10 according to this embodiment takes into consideration a possible worst-case temperature (a lower temperature) at the time of activation and sets the cancel-allowing current Is based on which the relays 41 and 42 (that is, the switches SW1 and SW2) are turned off in the stop process so that lithium deposition does not occur due to the circulating current even at the worst-case temperature.

Figure 5:
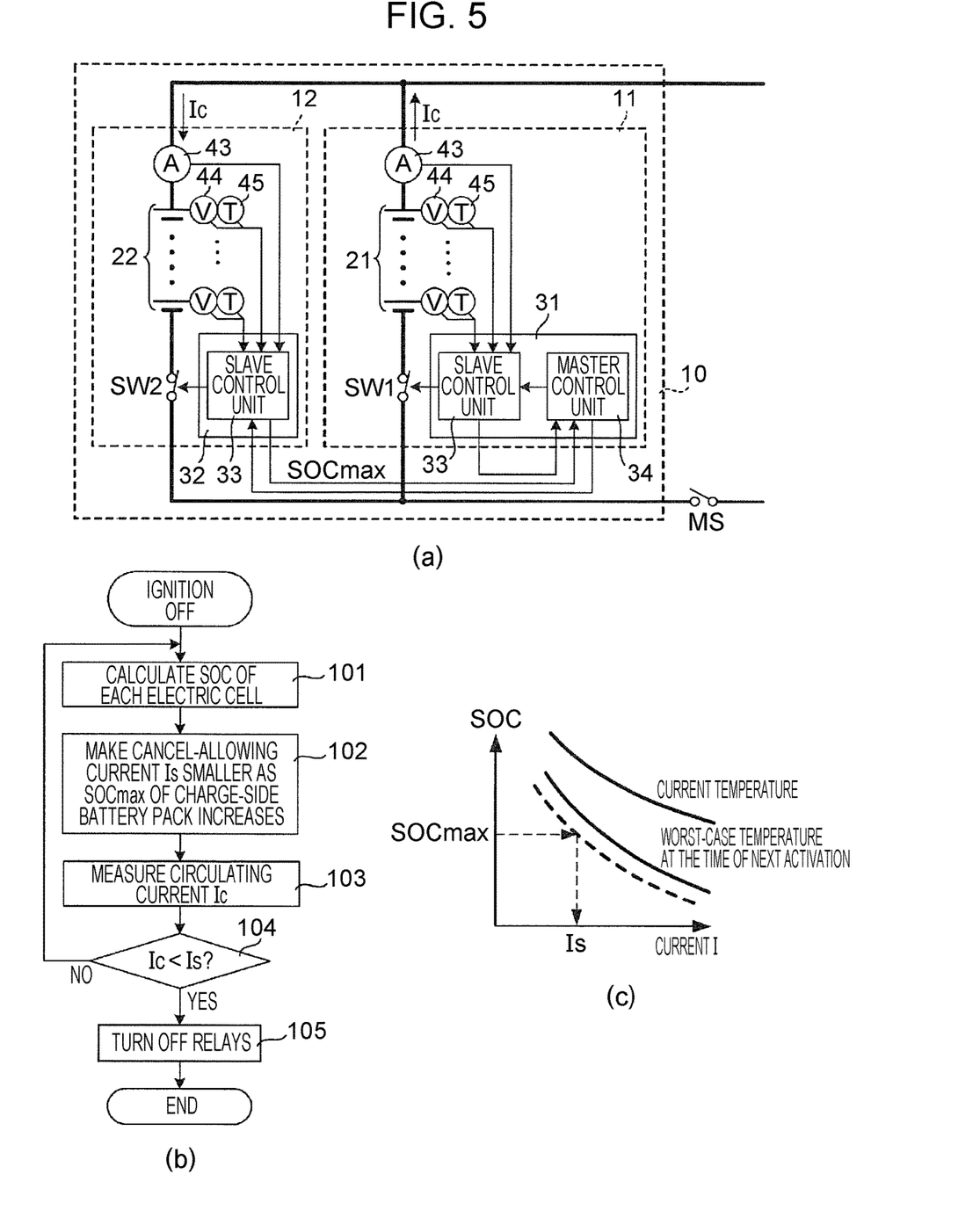
FIG. 5 includes diagrams for describing an operation of stopping charging of the power supply system.

FIG. 5 illustrates a specific operation in the stop process of the power supply system 10. FIG. 5(a) is a diagram illustrating the circuit illustrated in FIG. 1 in a simplified manner in which the relays 5 and 6 and the pre-charge relay 7 are collectively represented by the main switch MS, the relays 41 and 42 within the battery pack 11 are collectively represented by the switch SW1, and the relays 41 and 42 within the battery pack 12 are collectively represented by the switch SW2, as in FIG. 4.

The master BMS 31 includes the slave control unit 33, which is a unit that performs monitoring and control only for the battery pack 11, and the master control unit 34, which is a unit that performs control for the entire power supply system 10. The slave BMS 32 needs to perform only monitoring and control for the battery pack 12 in which the slave BMS 32 is provided, and therefore, includes only the slave control unit 33 similar to that provided in the master BMS 31. Measurement values obtained by the current sensor 43, the voltage sensor 44, and the temperature sensor 45 of the battery pack 12 are fed to the slave control unit 33 of the battery pack 12.

As illustrated in FIG. 5(b), in a case where the ignition switch is turned off, the device control unit 2 instructs the battery pack 11 and instructs the battery pack 12 via the battery pack 11 to perform calculations for turning off the switches SW1 and SW2.

The slave control units 33 calculate the SOC of each cell of the respective battery packs, as illustrated in step 101 in FIG. 5(b), on the basis of the current values of the battery strings 21 and 22 and the voltage and temperature of each cell. Each of the slave control units 33 sends the current value I in the corresponding battery pack and SOCmax, which is the maximum value among the SOCs of the cells included in the corresponding battery pack, to the master control unit 34. In step 102, the master control unit 34 identifies the battery pack (charge-side battery pack) into which the current flows and uses the SOCmax in the charge-side battery pack to set the cancel-allowing current Is.

Specifically, as illustrated in FIG. 5(c), a map in which the cancel-allowing current Is is set so as to decrease as the SOCmax increases is used. Next, the circulating current Ic is calculated by using the ammeter 43 in step 103, and it is determined whether the circulating current Ic falls below the cancel-allowing current Is in step 104. If Ic<Is is satisfied, the master control unit 34 performs control to turn off the relays 41 and 42 via the slave control unit 33 of each of the battery packs 11 and 12 in step 105 to complete the stop process. Otherwise, the flow returns to step 101, and the process is repeated.

FIG. 5(c) is a diagram for describing the method for determining the cancel-allowing current Is in this embodiment and illustrates the deposition limiting line, in which the horizontal axis represents the charging current I and the vertical axis represents the SOC of a cell, as in FIG. 3. Although the deposition limiting line moves in the up-down direction in the figure in accordance with the temperature, as represented by the thick solid lines in the figure, the deposition limiting line based on the current temperature and the deposition limiting line based on a worst-case temperature that is expected at the time of the next activation (in other words, an expected lowest temperature) can be assumed.

Accordingly, in this embodiment, the deposition limiting line represented by the thick wavy line in the figure, which is obtained by further adding a margin to the deposition limiting line based on the worst-case temperature expected at the time of the next activation, is assumed to be the deposition limiting line for threshold calculation, and a current determined by applying the SOCmax to the deposition limiting line for threshold calculation is assumed to be the cancel-allowing current Is. The deposition limiting line for threshold calculation is represented by a curved line along which the current I decrease as the SOC increases. Therefore, as the SOCmax increases, the determined cancel-allowing current Is decreases. The master control unit 34 retains data that represents the deposition limiting line for each temperature in the form of a map or a table, and calculates and uses the deposition limiting line for threshold calculation obtained by further adding a margin to the deposition limiting line corresponding to the worst-case temperature to thereby determine the cancel-allowing current Is.

As described above, in this embodiment, the cancel-allowing current Is is determined, the relays 41 and 42 are turned off when the circulating current Ic falls below the cancel-allowing current Is, and the cancel-allowing current Is (the threshold for turning off) is made smaller (so as to be stricter) as the SOC value of a cell having the maximum SOC value among the cells of the battery pack that is in a charged state with the circulating current Ic increases. Accordingly, the voltage difference between the packs can be decreased, and determination as to whether the parallel connection is allowed at the time of the next activation results in not-allowing to a smaller degree. Further, as the SOC of the battery pack that is in a charged state decreases, the cancel-allowing current Is is made larger (so as to be relaxed) to thereby enable reduction of the time taken until the relays are turned off. When the cancel-allowing current Is is calculated from the maximum SOC of the battery pack, the temperature of the battery pack is also taken into consideration, and therefore, lithium deposition due to a temperature change can be suppressed.

In this embodiment control that is performed in the case where the two battery packs 11 and 12 are provided has been described in detail. In a case where three or more battery cells are connected in parallel, on the basis of the SOC of a cell in the battery pack into which the largest amount of circulating current flows among the battery cells, control for decreasing the cancel-allowing current as the SOC value increases needs to be performed. In this embodiment, the description has been given under the assumption that the cancel-allowing current Is is made smaller as the SOC value increases. However, the cell voltage and the SOC value have a relationship in which the cell voltage monotonously increases as the SOC increases. Therefore, control using the cell voltage instead of the SOC value can be performed.

From the viewpoint of the relationship between the cell voltage and the SOC, the control based on the cell voltage can be regarded as control based on the SOC. Therefore, in this embodiment, the control for making the value of the cancel-allowing current smaller as the cell-maximum-SOC-equivalent value of the battery pack into which the largest amount of circulating current flowing between the plurality of battery packs flows increases includes the control for making the value of the cancel-allowing current smaller as the battery-cell maximum terminal voltage of the battery pack into which the largest amount of circulating current flowing between the plurality of battery packs flows increases.

Figure 6:
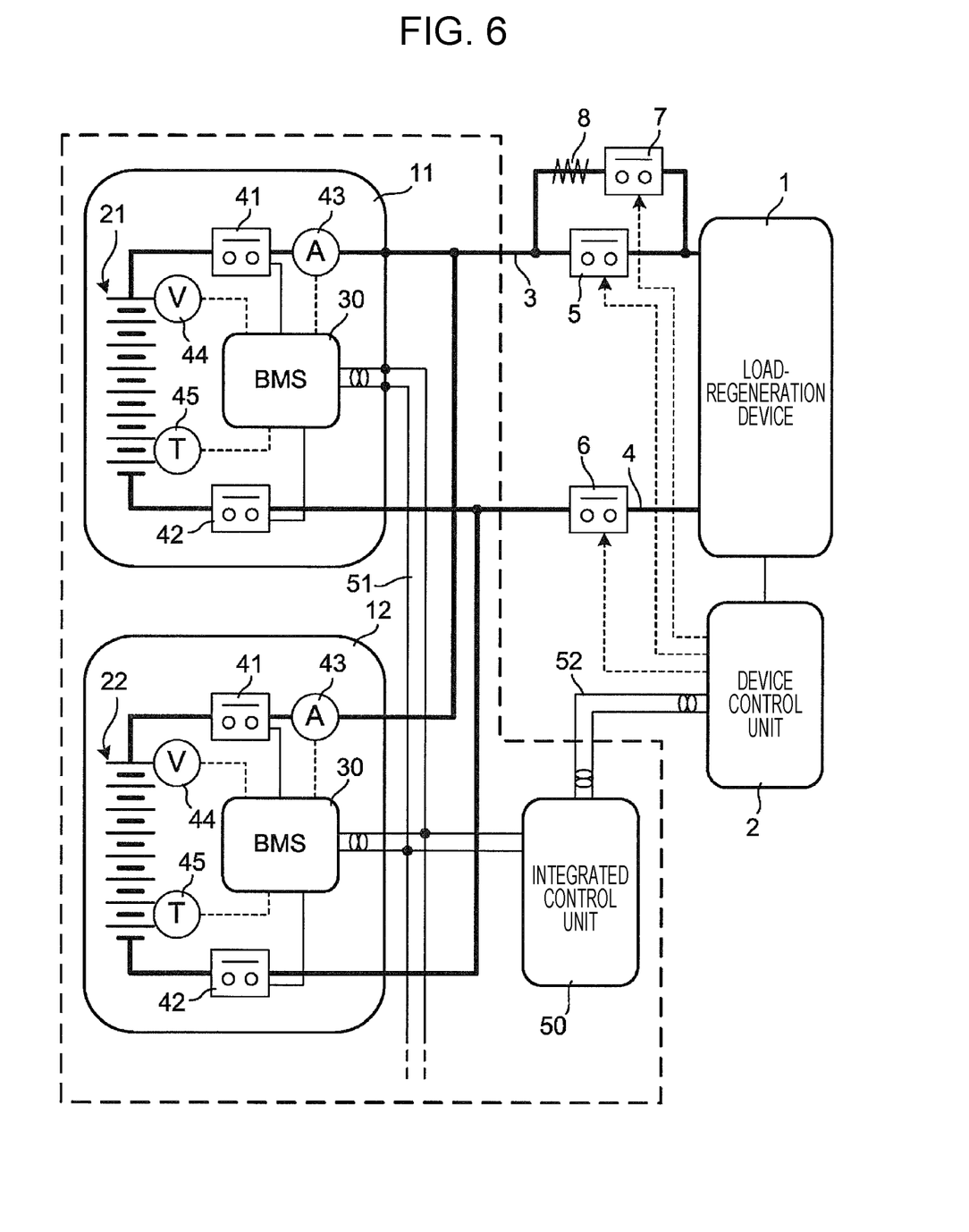
FIG. 6 is a diagram illustrating the power supply system according to another embodiment.

In the power supply system 10 illustrated in FIG. 1 and FIG. 5, among the plurality of battery packs 11 and 12 provided within the power supply system 10, the master BMS 31 is disposed in one of the battery packs, namely, the battery pack 11, and the slave BMS 32 is disposed in the other battery pack, namely, the battery pack 12; however, a power supply system to which the present invention is applicable is not limited to this power supply system. FIG. 6 illustrates another example of the power supply system 10 to which the present invention is applicable.

In the power supply system 10 illustrated in FIG. 6, a BMS 30 having only the functions of the slave control unit 33 is disposed in each of the battery packs 11 and 12, and an integrated control unit 50 is provided separately from the battery packs 11 and 12. The integrated control unit 50 has the functions of the master control unit 34, is connected with each BMS 30 via the signal line 51, and is connected also with the signal line 52 extending from the device control unit 2. When the process illustrated in FIG. 5(b) is performed in the power supply system 10 illustrated in FIG. 6, each BMS 30 performs the process in step 10, and the integrated control unit 50 performs the process from step 102 to step 105.

In the embodiment described so far, the flow has been described in which the load-regeneration device 1 is electrically disconnected by using the relays 5 to 7 (or the main switch MS), and thereafter, the power supply system 10 is stopped. The present invention is similarly applicable to a case where the current between the power supply system 10 and the load-regeneration device 1 becomes zero or substantially no current flows between the power supply system 10 and the load-regeneration device 1 due to the stop of the load-regeneration device 1, and thereafter, the power supply system 10 is stopped.

Further, the description has been given under the assumption that, for example, the battery string 22 is based on a series connection; however, a series-parallel connection obtained by combining a series connection with a parallel connection is applicable as long as the internal resistances of the respective packs are substantially the same. A battery string based on such a series-parallel connection is, for example, a battery string formed by connecting a plurality of unit batteries in series. As each of the unit batteries, a unit battery constituted by one battery cell (the embodiment described above) or a unit battery constituted by a plurality of battery cells connected in parallel may be used.

In this case, it is preferable that the SOC (state of charge) value of the battery pack into which the largest amount of circulating current flows be the SOC value of a unit battery within the pack, the SOC value of the unit battery being the maximum SOC value. Further, it is preferable that the voltage value of the battery pack into which the largest amount of circulating current flows be the voltage value of a unit battery within the pack, the voltage value of the unit battery being the maximum voltage value.

REFERENCE SIGNS LIST 1 load-regeneration device
10 power supply system
11, 12 battery pack
21, 22 battery string
30, 31, 32 BMS (battery management system)
34 master control unit (control means)
41, 42 relay
50 integrated control unit

The invention claimed is:

1. A power supply system comprising: a plurality of battery packs connected in parallel; and control means for controlling the plurality of battery packs,
    the plurality of battery packs each including a chargeable-dischargeable battery string, a relay provided in series to the battery string, and detection means for detecting a state of the battery string, wherein
    the control means performs control to turn off the relay of each of the plurality of battery packs when a circulating current that flows between the plurality of battery packs falls below a cancel-allowing current and, on the basis of a result of detection by the detection means, makes the cancel-allowing current smaller as an SOC (state of charge)-equivalent value of a batter pack, among the plurality of battery packs, into which a largest amount of the circulating current flows increases.

2. The power supply system according to claim 1, wherein the SOC-equivalent value is an SOC (state of charge) value of the battery pack into which the largest amount of the circulating current flows or a voltage value of the battery pack into which the largest amount of the circulating current flows.

3. The power supply system according to claim 1, wherein
    the battery string is formed by connecting a plurality of unit batteries in series, and
    the unit batteries are each constituted by one battery cell or a plurality of battery cells connected in parallel.

4. The power supply system according to claim 2, wherein the SOC (state of charge) value of the battery pack into which the largest amount of the circulating current flows is an SOC value of one of the unit batteries within the battery pack into which the largest amount of the circulating current flows, the SOC value of the one of the unit batteries being a maximum SOC value.

5. The power supply system according to claim 2, wherein the voltage value of the battery pack into which the largest amount of the circulating current flows is a voltage value of one of the unit batteries within the battery pack into which the largest amount of the circulating current flows, the voltage value of the one of the unit batteries being a maximum voltage value.

6. The power supply system according to claim 1, wherein
each battery pack among the plurality of battery packs includes a battery management system that monitors and controls the battery pack, and
the battery management system provided in one of the plurality of battery packs is a master battery management system that includes the control means.

* * * * *